US010095460B2

(12) United States Patent
Choi

(10) Patent No.: US 10,095,460 B2
(45) Date of Patent: Oct. 9, 2018

(54) VIDEO WALL SYSTEM

(71) Applicant: LG ELECTRONICS INC., Seoul (KR)

(72) Inventor: Inhyuk Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 2 days.

(21) Appl. No.: 14/925,229

(22) Filed: Oct. 28, 2015

(65) Prior Publication Data

US 2016/0162245 A1    Jun. 9, 2016

(30) Foreign Application Priority Data

Dec. 4, 2014  (KR) .................. 10-2014-0173044

(51) Int. Cl.
*G09G 5/00* (2006.01)
*G06F 3/14* (2006.01)

(52) U.S. Cl.
CPC .................. *G06F 3/1446* (2013.01)

(58) Field of Classification Search
CPC ..................................... G06F 3/1446
See application file for complete search history.

(56) References Cited

U.S. PATENT DOCUMENTS

| | | | | |
|---|---|---|---|---|
| 2011/0122048 A1* | 5/2011 | Choi | ............. | G06F 3/1446 345/1.1 |
| 2012/0229477 A1* | 9/2012 | Hsieh | ............. | G06F 3/1446 345/502 |
| 2013/0222441 A1* | 8/2013 | Yokoyama | ............. | G09G 5/10 345/690 |
| 2014/0111530 A1* | 4/2014 | Choi | ............. | G06F 12/00 345/545 |

FOREIGN PATENT DOCUMENTS

| | | |
|---|---|---|
| JP | 2008-51848 A | 3/2008 |
| KR | 10-2008-0044038 A | 5/2008 |
| KR | 10-2012-0061619 A | 6/2012 |
| KR | 10-1352768 B1 | 1/2014 |

* cited by examiner

*Primary Examiner* — Insa Sadio
(74) *Attorney, Agent, or Firm* — Birch, Stewart, Kolasch & Birch, LLP

(57) ABSTRACT

A video wall system including a first display apparatus configured to output a first portion of an image; and a second display apparatus disposed below the first display apparatus and configured to output a second portion of the image with a first predetermined time delay after the first display apparatus outputs the first portion of the image to reduce a visible step difference between the images output by the first and second display apparatuses.

18 Claims, 7 Drawing Sheets

(a)

(b)

(c)

(d)

(a)

(b)

(c)

(d)

(a)

(b)

(c)

VIDEO WALL SYSTEM

CROSS-REFERENCE TO A RELATED APPLICATION

This application claims the priority benefit of Korean Patent Application No. 10-2014-0173044, filed on Dec. 4, 2014 in the Korean Intellectual Property Office, the disclosure of which is incorporated herein by reference.

BACKGROUND OF THE INVENTION

1. Field of the Invention

The present invention relates to a video wall system and an operating method thereof, and more particularly to a video wall system and an operating method thereof, for more accurately displaying images without a step difference between a plurality of display apparatuses.

2. Description of the Related Art

A display apparatus displays an image watchable by a user. Various functions are capable of being implemented using the display apparatus. In addition, a video wall system may include a plurality of display apparatuses and divide and display one image on the display apparatuses or display the same image on the display apparatuses.

However, the related art video wall system displays an image with a step difference between the display apparatuses, which makes it more difficult for the user to watch.

SUMMARY OF THE INVENTION

Therefore, one object of the present invention is to provide a video wall system and an operating method thereof, for more accurately displaying images without a step difference between a plurality of display apparatuses.

To achieve these and other advantages and in accordance with the purpose of the present invention, as embodied and broadly described herein, the present invention provides in one aspect a video wall system including a first display apparatus and a second display apparatus disposed below the first display apparatus, and when the first and second display apparatuses display divided images, the second display apparatus outputs an image with a time delay corresponding to predetermined time after the first display apparatus outputs an image.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Exemplary embodiments of the present invention will be described with reference to the attached drawings. Throughout this specification, the suffixes "module" and "unit" are used simply for convenience of description, and do not have any special meaning or function. Thus, the suffixes "module" and "unit" may be used interchangeably.

Figure 1:
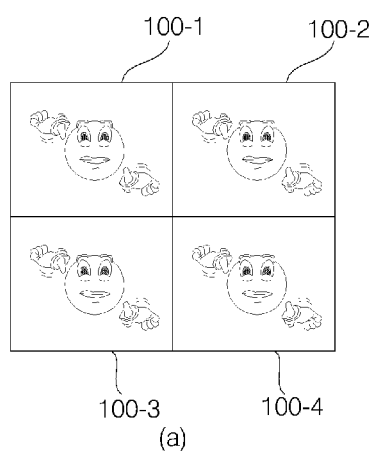
FIG. 1 is a diagram illustrating examples of a video wall system.
Figure 1:
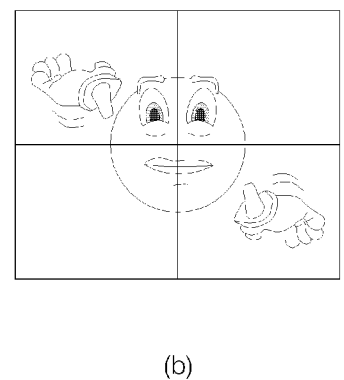
Figure 1:
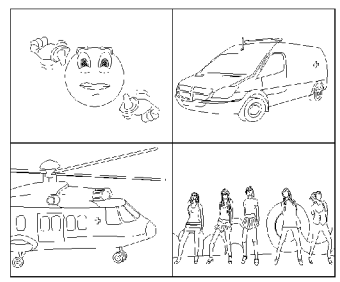
Figure 1:

FIG. 1 is a diagram illustrating examples of a video wall system. Display apparatuses for constituting the video wall system may be arranged and may display an image in various manners. In particular, FIGS. 1(a) to 1(c) illustrate examples in which display apparatuses 100-1, 100-2, 100-3, and 100-4 of the video wall system are configured in a 2×2 arrangement. Although FIGS. 1(a) to 1(d) illustrate examples where all the display apparatus are arranged adjacent each other, the display apparatus may be arranged spaced apart from each other by a predetermined interval.

As illustrated in FIG. 1(a), the display apparatuses 100-1, 100-2, 100-3, and 100-4 of the video wall system may display the same image, and, as illustrated in FIG. 1(b), the display apparatuses 100-1, 100-2, 100-3, and 100-4 may divide one image and display the divided images on the entire video wall system.

As illustrated in FIG. 1(c), the display apparatuses 100-1, 100-2, 100-3, and 100-4 may display different images so as to simultaneously provide various images to a user. FIG. 1(d) illustrates an example in which a plurality of display apparatuses is arranged in a row.

In some embodiments, a plurality of display apparatuses may be serially connected. For example, as illustrated in FIG. 1(a), for a video wall system with an arrangement corresponding to a matrix formation of two rows and two columns, the display apparatus 100-1 at a first row and a first column may be serially connected to the display apparatus 100-2 at a first row and a second column, the display apparatus 100-2 at the first row and the second column may be serially connected to the display apparatus 100-3 at a second row and the first column, and the display apparatus 100-3 at the second row and the first column may be serially connected to the display apparatus 100-4 at the second row and the second column. In this instance, one signal may be sequentially transmitted.

Figure 2:
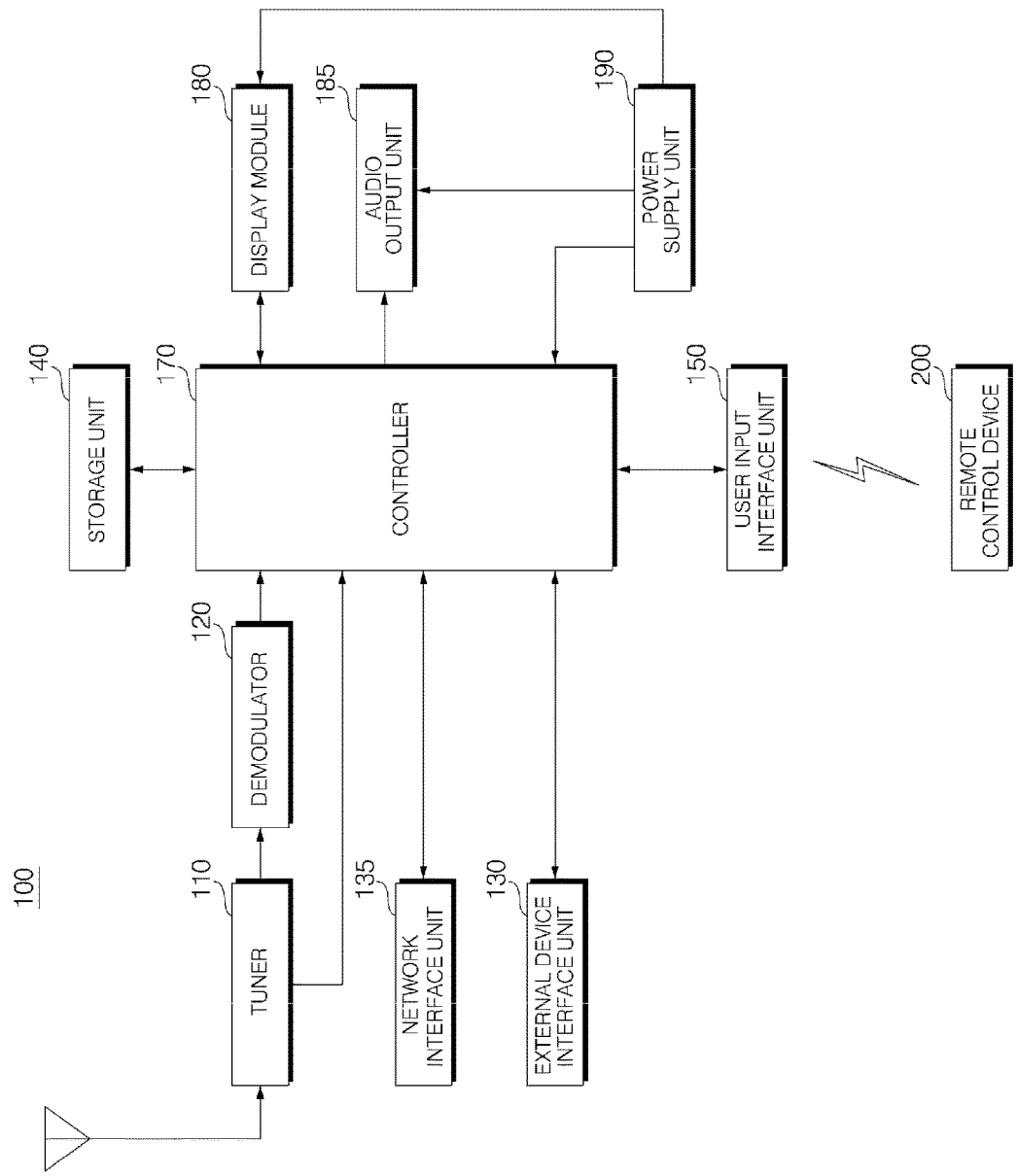
FIG. 2 is an internal block diagram of an individual display apparatus according to an embodiment of the present invention.

Next, FIG. 2 is an internal block diagram of an individual display apparatus 100 constituting a video wall system according to an embodiment of the present invention. Referring to FIG. 2, the display apparatus 100 according to an embodiment of the present invention may include a tuner 110, a demodulator 120, an external device interface unit 130, a network interface unit 135, a storage unit 140, a user input interface unit 150, a controller 170, a display module 180, an audio output unit 185, and, a power supply unit 190.

Although FIG. 2 illustrates an embodiment in which the tuner 110, etc. are included, the scope of the present invention is not limited thereto. For example, the display apparatus 100 may be a monitor that does not support a broadcast receiving function as well as a television (TV). Further, the tuner 110 tunes a radio frequency (RF) broadcast signal corresponding to all pre-stored channels or a channel selected by a user among RF broadcast signals received through an antenna. In addition, the tuner 110 converts the tuned RF broadcast signal into an intermediate frequency signal, a base-band image, or a voice signal.

For example, when the tuned RF broadcast signal is a digital broadcast signal, the tuner 110 converts the tuned RF broadcast signal into a digital IF (DIF) signal, and when the tuned RF broadcast signal is an analog signal, the tuner converts the tuned RF broadcast signal into an analog base-band image or a voice signal (CVBS/SIF). That is, the tuner 110 may process a digital broadcast signal or an analog broadcast signal. The analog base-band image or voice signal (CVBS/SIF) output from the tuner 110 may be input directly to the controller 170.

In addition, the tuner 110 may receive an RF broadcast signal of a single carrier based on advanced television system committee (ATSC) or RF broadcast signals of a plurality of carriers based on digital video broadcasting (DVB). The tuner 110 may sequentially tune RF broadcast signals of all broadcast channels stored via a channel recording function among RF broadcast signals received through an antenna and may convert the tuned RF broadcast signals into an intermediate frequency signal, a base-band image, or a voice signal.

The demodulator 120 receives the digital IF (DIF) signal converted by the tuner 110 and performs a demodulation operation. For example, when the digital IF signal output from the tuner 110 is based on ATSC, the demodulator 120 performs 8-vestigal side band (8-VSB) demodulation. In addition, the demodulator 120 may perform channel demodulation. Thus, the demodulator 120 may include a trellis decoder, a de-interleaver, a Reed-Solomon decoder, and the like and perform trellis decoding, deinterleaving, and Reed-Solomon decoding.

For example, when the digital IF signal output from the tuner 110 is based on DVB, the demodulator 120 performs coded orthogonal frequency division modulation (COFDMA) demodulation. In addition, the demodulator 120 may perform channel decoding. Thus, the demodulator 120 may include a convolution decoder, a de-interleaver, a Reed-Solomon decoder, and the like and perform convolutional decoding and Reed-Solomon decoding.

The demodulator 120 may output a transport stream (TS) after demodulation and channel decoding. In this instance, the transport stream (TS) may be a signal obtained by multiplexing an image signal, a voice signal, or a data signal. For example, the transport stream (TS) may be an MPEG-2 transport stream (TS) obtained by multiplexing an image signal according to MPEG-2, Dolby AC-3 voice signal, or the like. In more detail, the MPEG-2 TS may include a 4-byte header and a 184-byte payload. The aforementioned demodulator 120 may include separate demodulators according to ATSC and DVB. That is, the demodulator 120 may include an ATSC demodulator and a DVB demodulator.

The stream signal output from the demodulator 120 may be input to the controller 170. The controller 170 may perform de-multiplexing, image/voice signal processing, etc., output an image to the display module 180, and then output voice to the audio output unit 185. The external device interface unit 130 may perform access between an external device and the display apparatus 100. Thus, the external device interface unit 130 may include an A/V input/output unit or a wireless communication unit.

The external device interface unit 130 may access an external device such as a digital versatile disc (DVD), a Blu-ray player, a game console, a camera, a camcorder, a computer (a notebook computer), etc. by wire or wirelessly. The external device interface unit 130 transmits an image signal, a voice signal, or a data signal that is externally input through the connected external device to the controller 170 of the display apparatus 100. In addition, the image signal, the voice signal, or the data signal processed by the controller 170 may be output to the connected external device. Thus, the external device interface unit 130 may include an A/V input/output unit or a wireless communication unit.

The A/V input/output unit may include a universal serial bus (USB) terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc. so as to input the image and voice signals of the external device to the display apparatus 100.

The wireless communication unit may perform near field communication with other electronic devices. The display apparatus 100 may be connected to other electronic devices via a network according to communication standards such as Bluetooth, radio frequency identification (RFID), infrared data association (IrDA), Ultra Wideband (UWB), ZigBee, etc.

In addition, the external device interface unit 130 may access various set-top boxes through at least one of the aforementioned various terminals and may perform an input/output operation to and from the set-to boxes. The external device interface unit 130 may be divided into a transmitter for transmitting data and a signal and a receiver for receiving data and a signal.

The network interface unit 135 provides an interface for access between the display apparatus 100 and a wired/wireless network including the Internet. The network interface unit 135 may include an Ethernet terminal, etc. for access to a wired network and use communication standards such as wireless LAN (Wi-Fi), wireless broadband (WiBro), world interoperability for microwave access (Wimax), high speed downlink packet access (HSDPA), etc. for access to a wireless network.

The network interface unit 135 may receive content or data provided by the Internet, a content provider, or a network operator through a network. That is, the network interface unit 135 may receive content such as a movie, advertisement, a game, video on demand (VOD), a broadcast signal, etc. and information related thereto, which are provided by the content provider through the network. The network interface unit 135 may receive update information and update files of firmware provided by the network operator. In addition, the network interface unit 135 may transmit data to the Internet provider, or the content provider, or the network operator.

In addition, the network interface unit 135 may access, for example, an Internet protocol (IP) TV, receive image, voice, and data signals processed by a set-top box for the IPTV and transmit the signals to the controller 170 so as to enable bidirectional communication, and transmit the signals processed by the controller 170 to the set-top box for the IPTV. The aforementioned IPTV may be interpreted as including ADSL-TV, VDSL-TV, FTTH-TV, etc. or interpreted as including TV over DSL, Video over DSL, TV overIP (TVIP), Broadband TV (BTV), etc. according to transmission network type. In addition, the IPTV may be interpreted as including a full browsing TV and an Internet TV that are capable of accessing the Internet.

The storage unit 140 may store programs for processing and controlling various signals in the controller 170 or store signal-processed images, voice, or data signals. The storage unit 140 may temporarily store image, voice, or data signals to be output. The storage unit 140 may include a buffer, and a main memory and a buffer may be separately configured in some embodiments.

The storage unit 140 may temporarily store image, voice, or data signals input to the external device interface unit 130. In addition, the storage unit 140 may store information about a predetermined broadcast channel via a channel recoding function such as a channel map, etc. The storage unit 140 may include at least one type of storage medium such as a flash memory, a hard disc, a multimedia card micro, a card type memory (e.g. an SD or XD memory, etc.), a RAM, and a ROM (EEPROM, etc.). The display apparatus 100 may reproduce files (a moving picture file, a still image file, a music file, a document file, etc.) stored in the storage unit 140 to provide the files to a user. Although FIG. 2 illustrates an embodiment in which the storage unit 140 and the controller 170 are separately configured, the scope of the present invention is not limited thereto. The storage unit 140 may be included in the controller 170.

The user input interface unit 150 may transmit a signal input by a user to the controller 170 or transmit a signal from the controller 170 to the user. For example, the user input interface unit 150 may receive a user input signal such as power on/off, channel selection, screen setting, etc. from a remote control device 200 or transmit a signal from the controller 170 to the remote control device 200 according to various communication methods such as a radio frequency (RF) communication method, an infrared (IR) communication method, etc.

For example, the user input interface unit 150 may transmit a user input signal input from a local key such as a power key, a channel key, a volume key, a setting key, etc. to the controller 170. In addition, for example, the user input interface unit 150 may transmit a user input signal input from a sensor for detecting user gestures to the controller 170 or transmit a signal from the controller 170 to the sensor. Here, the sensor may include a touch sensor, a voice sensor, a position sensor, a motion sensor, etc.

The controller 170 may multiplex a stream input through the tuner 110, the demodulator 120, or the external device interface unit 130 or process multiplexed signals to generate and output signals for image or voice output. The image signal that is image-processed by the controller 170 may be input to the display module 180 and displayed as an image corresponding to the corresponding image signal. In addition, the image signal that is image-processed by the controller 170 may be input to an external output device through the external device interface unit 130.

The voice signal processed by the controller 170 may be output as sound to the audio output unit 185. In addition, the voice signal processed by the controller 170 may be input to an external output device through the external device interface unit 130. Although not illustrated in FIG. 2, the controller 170 may include a multiplexer, an OSD generator, an image processor, etc.

The controller 170 may control an overall operation of the display apparatus 100. For example, the controller 170 may control the tuner 110 to tune to an RF broadcast corresponding to a channel selected by a user or a pre-stored channel. In addition, the controller 170 may control the display apparatus 100 according to a user command or an internal program input through the user input interface unit 150.

For example, the controller 170 controls the tuner 110 to input a signal of a channel selected according to a predetermined channel selection command received through the user input interface unit 150. In addition, the controller 170 processes image, voice, or data signals of the selected channel. The controller 170 may output channel information selected by the user together with the processed image or voice signal through the display module 180 or the audio output unit 185.

As another example, the controller 170 may output an image signal or a voice signal, which is input from an external device, for example, a camera or a camcorder through the external device interface unit 130, through the display module 180 or the audio output unit 185 according to an external device image reproduction command received through the user input interface unit 150

The controller 170 may control the display module 180 to display an image. For example, the controller 170 may control the display module 180 to display a broadcast image input through the tuner 110, an external input image input through the external device interface unit 130, an image input through the network interface unit 135, or an image stored in the storage unit 140.

In this instance, the image displayed on the display module 180 may be a still image or a moving picture, and a two-dimensional (2D) image or a three-dimensional (3D) image. The controller 170 may generate and display, as a 3D object, a predetermined object of the image displayed on the display module 180.

The display module 180 converts the image signal, data signal, OSD signal, or control signal processed by the controller 170, or the image signal, data signal, or control signal received by the external device interface unit 130 to generate a driving signal. The display module 180 may be a plasma display panel (PDP), a liquid crystal display (LCD), an organic light emitting diode display (OLED), a flexible display module, or the like. The display module 180 may be configured as a touchscreen and used as an input device as well as an output device.

The audio output unit 185 receives the signal that is voice-processed by the controller 170, for example, a stereo signal, a 3.1 channel signal, or a 5.1 channel signal to output voice. The audio output unit 185 may be embodied as various types of speakers.

As described above, in order to detect user gestures, the display apparatus 100 may further include at least one of a voice sensor, a position sensor, and a motion sensor. A signal detected by the sensor is transmitted to the controller 170 through the user input interface unit 150. The controller 170 may detect user gestures from a combination or each of an image captured by an image capture unit and a signal detected from the sensor.

The power supply unit 190 supplies corresponding power over the display apparatus 100. In particular, the power supply unit 190 may supply power to the controller 170 that may be embodied in the form of a system on chip (SOC), the display module 180 for image display, and the audio output unit 185 for audio output. In addition, in some embodiments, the power supply unit 190 may supply power to a heater including a hot wire.

The remote control device 200 transmits user input to the user input interface unit 150. Thus, the remote control device 200 may use IR communication, radio frequency (RF) communication, Bluetooth, ultra wideband (UWB), ZigBee, etc. In addition, the remote control device 200 may receive the image, voice, or data signals output from the user input interface unit 150 and display the signals on the remote control device 200 or output the signals as voice.

The block diagram of the display apparatus 100 illustrated in FIG. 2 is an embodiment of the present invention. Components of the block diagram may be integrated, added, or omitted according to specifications of the actually embodied display apparatus 100. That is, as necessary, two or more components may be integrated into one component or one component may be sub-divided into two or more components. In addition, a function of each block is used for description of an embodiment of the present invention and an operation or device of the block does not limit the scope of the present invention.

Figure 3:
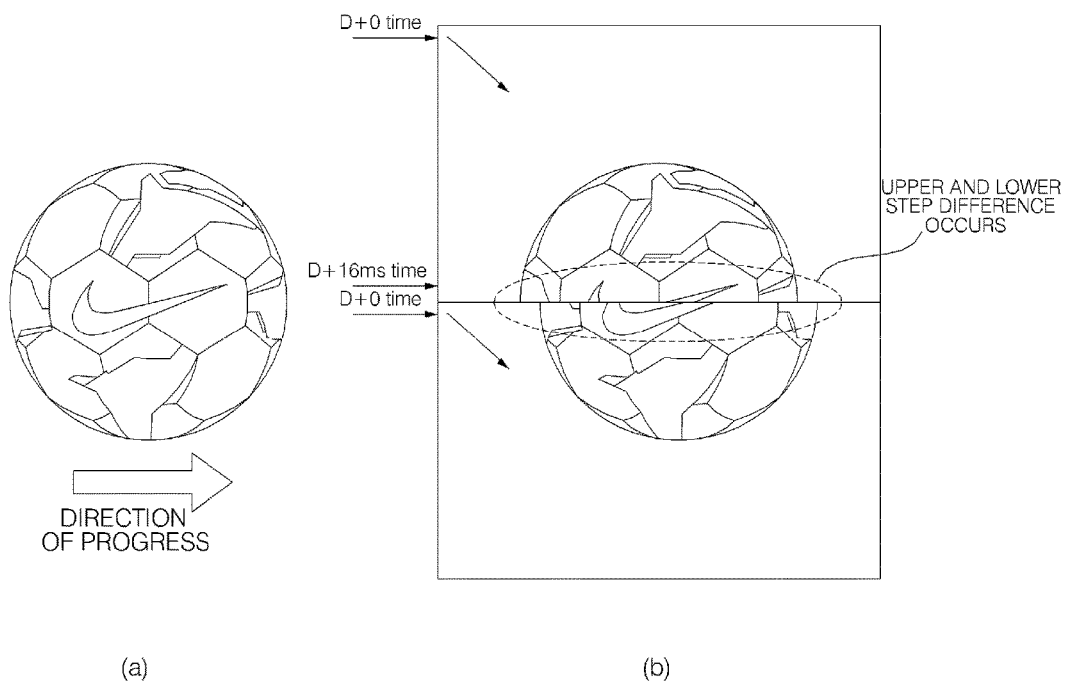
FIGS. 3 to 5 are diagrams illustrating examples in which an image is displayed by a video wall system.
Figure 4:
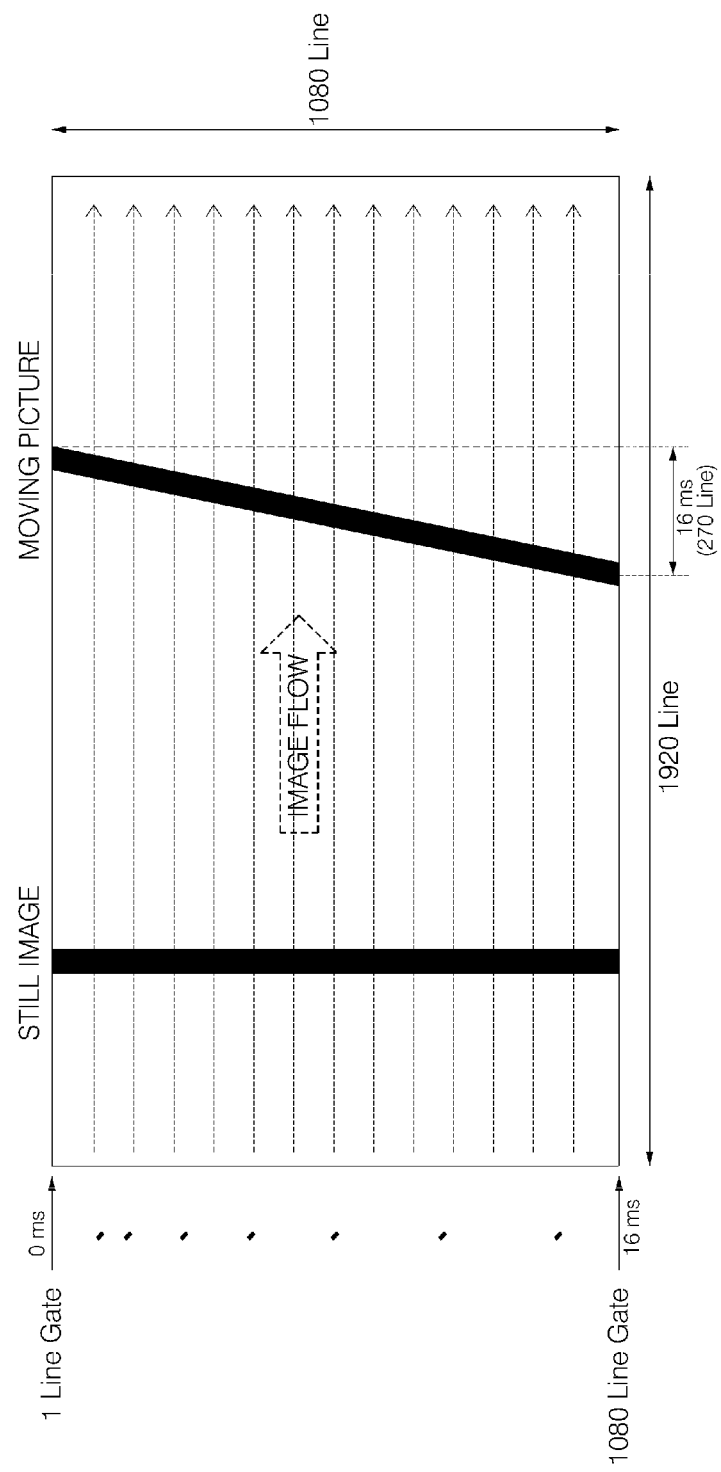
Figure 5:
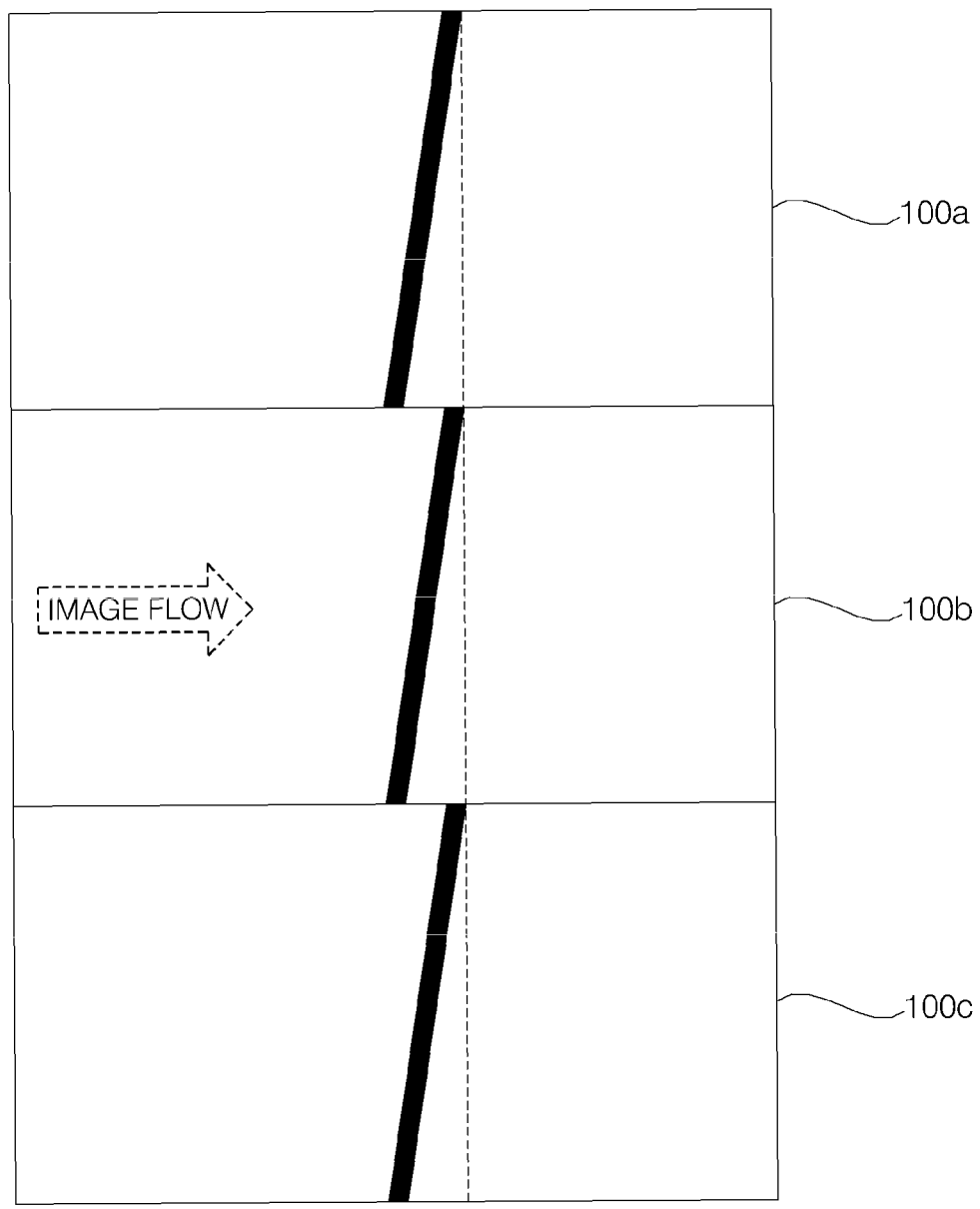

Next, FIGS. 3 to 5 are diagrams illustrating examples in which an image is displayed by a video wall system. In particular, FIG. 3 illustrates the case in which two display apparatuses divide an image including a ball illustrated in FIG. 3(a) into upper and lower portions and displays the image in a video wall system including the two display apparatuses that are arranged in a vertical direction as illustrated in FIG. 3(b).

Referring to FIG. 3(b), a step difference is generated due to a delay time between the upper display apparatus and the lower display apparatus, and thus the ball may not be accurately displayed. The delay time between the upper display apparatus and the lower display apparatus may be generated from a signal scanning method of a display apparatus such as a liquid display module (LCM), etc.

Referring to FIG. 4, a display apparatus including a liquid display module (LCM) having specifications of FHD 1920*1080 60 Hz as one frame image may sequentially display an image from a 1 line gate to a last 1080 line gate. The liquid display module (LCM) embodies an image by sequentially turning on an uppermost line gate (gate #1) and then displays an image by turning on a gate #2 and then turning on gates from an upper gate.

Thus, the liquid display module (LCM) may generate a time difference between time points when images are turned on by an uppermost line gate and a lowermost line gate. Accordingly, about 16 ms may be consumed to display 1 frame image based on 1920*1080 (effective 1080 line and blank 270 line) 60 Hz. Image 1 Frame display=1/60 Hz=16 ms Thus, in a tile mode in which the upper display apparatus and the lower display apparatus divide and display one image, a time difference may be generated between time points when images are turned on by a lowermost end of the upper display apparatus and an uppermost end of the lower display apparatus, as illustrated in FIG. 3(b). The liquid display module (LCM) displays an image in units of gate lines, and thus a time difference may not occur when the image is embodied between right and left portions of the liquid display module (LCM).

FIG. 5 illustrates a portion of a 3*N video wall system or a video wall system including three display apparatuses 100a, 100b, and 100c that are arranged in a vertical direction. Referring to FIG. 5, the first to third display apparatuses 100a, 100b, and 100c display an image in synchronization, and thus a step difference may occur between upper and lower display apparatuses.

Referring to FIG. 5, a time difference may be generated between time points when images are embodied by a lowermost end of the upper first display apparatus 100a and an uppermost end of the lower second display apparatus 100b, and a time difference may be generated between time points when images are embodied by a lowermost end of the upper second display apparatus 100b and the uppermost end of the lower third display apparatus 100c.

Figure 6:
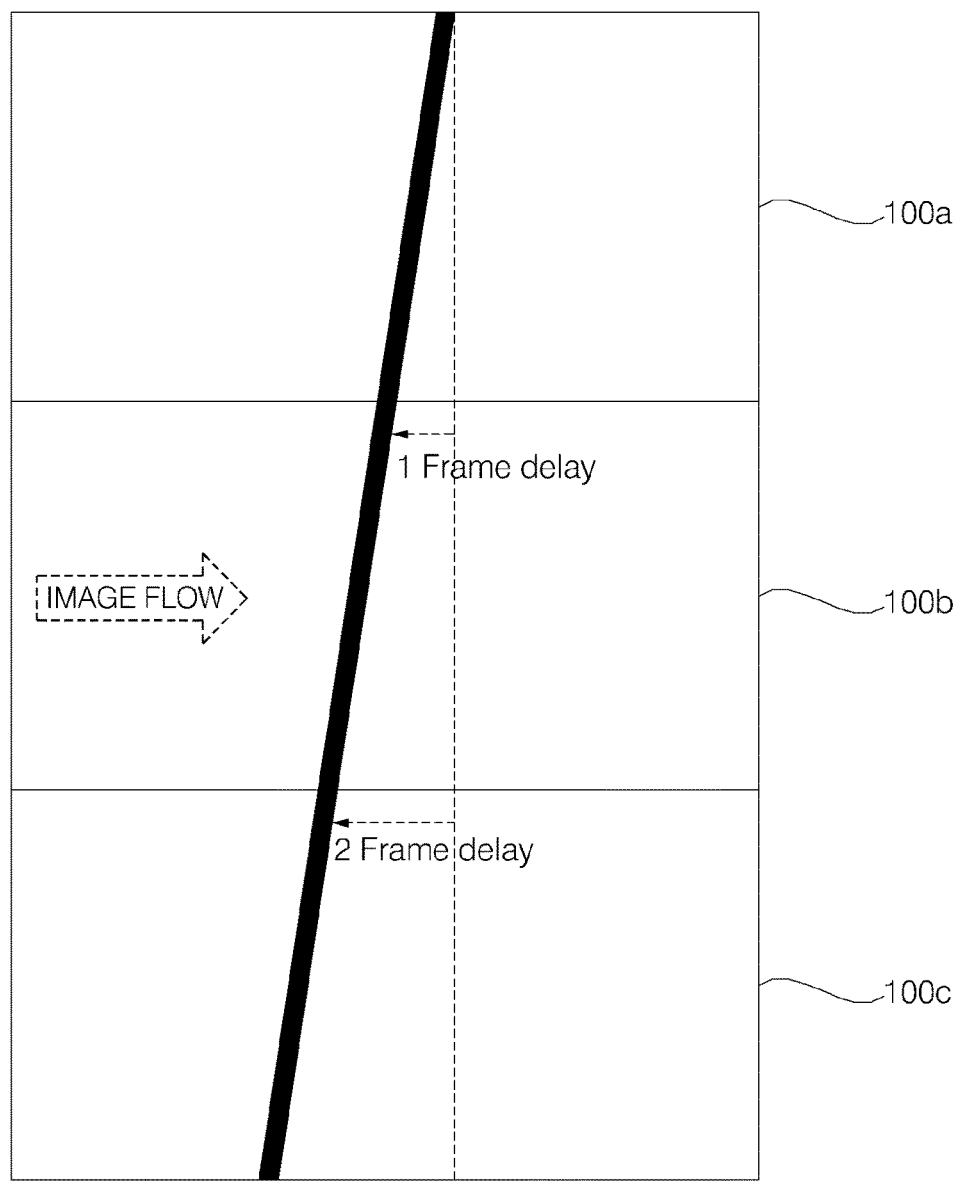
FIGS. 6 and 7 are diagrams illustrating an operation of a video wall system according to an embodiment of the present invention.
Figure 7:
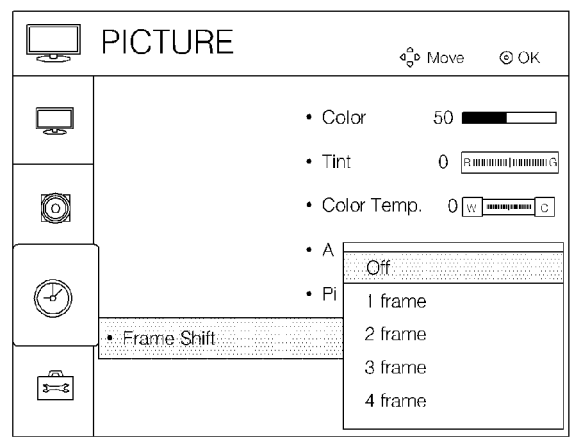
Figure 7:
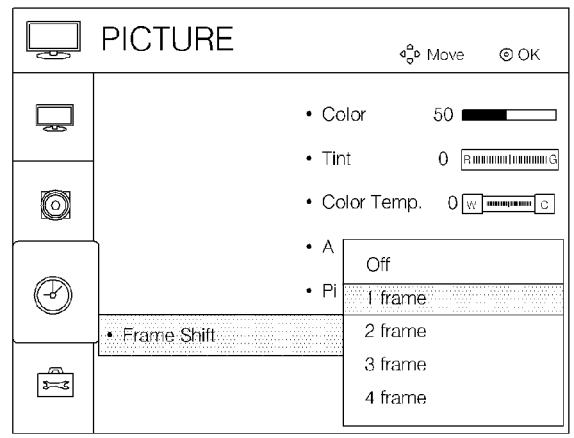
Figure 7:
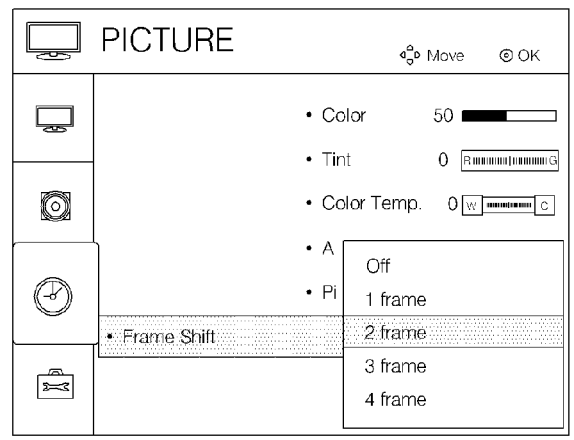

Next, FIGS. 6 and 7 are diagrams illustrating explanations of an operation of a video wall system according to an embodiment of the present invention. In particular, FIG. 6 illustrates a portion of a 3*N video wall system or a video wall system including three display apparatuses 100a, 100b, and 100c that are arranged in the vertical direction.

The video wall system according to an embodiment of the present invention may at least include a first display apparatus 100a, and a second display apparatus 100b disposed below the first display apparatus 100a. The video wall system may divide one image into images, the number of which corresponds to the number of the display apparatuses, and display partial images of the divided image, which are set to be displayed by the respective display apparatuses, on the respective display apparatuses.

Referring to FIG. 6, in the video wall system according to an embodiment of the present invention, when the first and second display apparatuses 100a and 100b display divided images obtained by dividing one image, the second display apparatus 100b may output an image with a time delay corresponding to a predetermined time after the first display apparatus 100a outputs an image.

That is, as described with reference to FIG. 5, in order to offset a time difference between time points when images are embodied by a lowermost end of the upper first display apparatus 100a and an uppermost end of the lower second display apparatus 100b, the lower second display apparatus 100b may output an image with a time delay corresponding to the predetermined time.

In addition, the second display apparatus 100b may output an image with a time delay corresponding to one frame of the output image, for example, 16 ms for a 60 Hz display module. The first display apparatus 100a and the second display apparatus 100b included in the video wall system may enlarge and display different partial portions of respective input images.

The video wall system according to an embodiment of the present invention may further include the third display apparatus 100c disposed below the second display apparatus 100b. When the first to third display apparatuses 100a, 100b, and 100c display the divided images, the third display apparatus 100c may output an image with a time delay corresponding to the predetermined time after the second display apparatus 100b outputs an image. Thus, the second display apparatus 100b may output an image after time delay of 1 frame (16 ms) and the third display apparatus 100c may output an image after time delay of 2 frames (32 ms).

The video wall system according to an embodiment of the present invention may further include the third display apparatus 100c disposed below the second display apparatus 100b. When the first to third display apparatuses 100a, 100b, and 100c display the divided images, the third display apparatus 100c may output an image with a time delay corresponding to twice the predetermined time T with which the second display apparatus 100b outputs an image compared with the first display apparatus 100a.

That is, a corresponding display apparatus may display an image with a time delay corresponding to n times of the predetermined time T according to an order (n) of the corresponding display apparatus disposed below the uppermost display apparatus.

Display apparatuses included in a video wall system according to an embodiment of the present invention may be daisy chained to adjacent display apparatuses. For example, the first display apparatus 100a and the second display apparatus 100b may be daisy chained to respective adjacent display apparatuses.

For example, when as illustrated in FIG. 1(a), for a video wall system with arrangement corresponding to a matrix formation of two rows and two columns, the display apparatus 100-1 at a first row and a first column may be connected to the display apparatus 100-2 at a first row and a second column, the display apparatus 100-2 at the first row and the second column may be connected to the display apparatus 100-3 at the second row and the second column, and the display apparatus 100-4 at the second row and the second column may be connected to the display apparatus 100-3 at a second row and a first column. In addition, a corresponding display apparatus may receive an input image signal, a control signal, etc. from a display apparatus adjacent thereto and bypass the input image signal, the control signal, etc. to another display apparatus adjacent thereto.

In this instance, each display apparatus may divide an image input from an adjacent display apparatus and display an image of the divided images, which corresponds to a predetermined unique ID of the display apparatus. The predetermined time may be a predetermined delay setting value for each respective display apparatus and may be set as time corresponding to a frame unit.

According to an embodiment of the present invention, a user interface (UI) for controlling a time for outputting an image signal on a monitor may be configured and provided so as to be set according to a video wall system configuration environment.

FIG. 7 is a diagram illustrating examples of images of a UI for setting delay time. In particular, FIG. 7(a) illustrates a setting image of the first display apparatus 100a. In this instance, a delay time is not set.

FIG. 7(b) illustrates an example in which a delay time corresponding to 1 frame unit is set via a setting image of the second display apparatus 100b, and FIG. 7(c) illustrates an example in which a delay time corresponding to 1 frame unit ×2, that is, 2 frames is set as a setting image of the third display apparatus 100c.

The predetermined time may be automatically set according to an arrangement position of each respective display apparatus. In addition, a frame buffer of the second display apparatus 100b may output an image with a time delay corresponding to the predetermined time. The first display apparatus 100a and the second display apparatus 100b may separately include a controller and a frame buffer.

A step difference may be generated between sets of display apparatuses due to a time delay between an upper end and a lower end of display apparatuses according to a scanning method of the display apparatuses included in a related art video wall system. In this instance, an image may be shifted due to time delay between an upper display apparatus set and a lower display apparatus set when a moving picture is embodied.

According to an embodiment of the present invention, an image delay may be applied to a lower display apparatus set by as much as delay time in an upper display apparatus set of a video wall system so as to remove an image difference between the upper and lower display apparatus sets.

Accordingly, a video wall may be configured with a plurality of display apparatuses and may display one image, thereby preventing an image from being shifted in the display apparatus set. According to an embodiment of the present invention, divided images may be more accurately displayed via a plurality of display apparatuses and each display apparatus of the video wall system may be simply and conveniently set.

The video wall system and the operation method thereof according to the foregoing embodiments are not limited to the configurations and methods of the above-described embodiments. That is, the above-described embodiments may be partially or wholly combined to make various modifications.

The operating method of a video wall system according to the foregoing embodiments may be implemented as code that can be written to a computer-readable recording medium and can thus be read by a processor. The computer-readable recording medium may be any type of recording device in which data can be stored in a computer-readable manner. Examples of the computer-readable recording medium include a ROM, a RAM, a CD-ROM, a magnetic tape, a floppy disc, and an optical data storage, and a carrier wave and include data transmission over the Internet. The computer-readable recording medium can be distributed over a plurality of computer systems connected to a network so that computer-readable code is written thereto and executed therefrom in a decentralized manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A video wall system comprising:
   a first display apparatus configured to output a first portion of an image;
   a second display apparatus disposed below the first display apparatus and configured to output a second portion of the image with a first predetermined time delay after the first display apparatus outputs the first portion of the image to reduce a visible step difference between the images output by the first and second display apparatuses; and
   a third display apparatus disposed below the second display apparatus and configured to output a third portion of the image with a second predetermined time delay twice that of the first predetermined time delay,
   wherein the first predetermined time delay is set according to an arrangement position of the second display apparatus with respect to the first display apparatus,
   and wherein the first display apparatus and the second display apparatus sequentially display the image from an uppermost line gate to a lowermost line gate.

2. The video wall system according to claim 1, wherein the first predetermined time delay corresponds to a 1 frame delay of the first image output by the first display apparatus.

3. The video wall system according to claim 1, wherein the second predetermined time delay is set according to an arrangement position of the third display apparatus with respect to the first display apparatus.

4. The video wall system according to claim 1, wherein the first display apparatus and the second display apparatus are daisy chained to respective adjacent display apparatuses.

5. The video wall system according to claim 1, wherein the first predetermined time delay is previously set for the second apparatus.

6. The video wall system according to claim 1, wherein the first predetermined time delay is automatically set according to an arrangement position of the second display apparatus with respect to the first display apparatus.

7. The video wall system according to claim 1, wherein the second display apparatus includes a frame buffer configured to output an image with the first predetermined time delay.

8. The video wall system according to claim 1, wherein each of the first display apparatus and the second display apparatus separately include a controller and a frame buffer.

9. The video wall system according to claim 1, wherein the first display apparatus and the second display apparatus are further configured to enlarge and display different partial portions of respective input images.

10. The video wall system according to claim 1, wherein at least one of the first and second display apparatuses includes a graphical user interface for setting the first predetermined time delay of the second display apparatus.

11. The video wall system according to claim 10, wherein the graphical user interface includes at least a no delay option, and multiple frame delay values.

12. The method according to claim 11, wherein the second display apparatus includes a frame buffer configured to output an image with the first predetermined time delay.

13. A method of controlling a video wall system including a first display apparatus and a second display apparatus disposed below the first display apparatus, the method comprising:

outputting, via the first display apparatus, a first portion of an image;

outputting, via the second display apparatus, a second portion of the image with a first predetermined time delay after the first display apparatus outputs the first portion of the image to reduce a visible step difference between the images output by the first and second display apparatuses; and outputting, via a third display apparatus disposed below the second display apparatus, a third portion of the image with a second predetermined time delay twice that of the first predetermined time delay, wherein the first predetermined time delay is set according to an arrangement position of the second display apparatus with respect to the first display apparatus, and wherein the first display apparatus and the second display apparatus sequentially display the image from an uppermost line gate to a lowermost line gate.

14. The method according to claim 13, wherein the time delay corresponds to a 1 frame delay of the first image output by the first display apparatus.

15. The method according to claim 13, wherein the second predetermined time delay is set according to an arrangement position of the third display apparatus with respect to the first display apparatus.

16. The method according to claim 13, wherein the first display apparatus and the second display apparatus are daisy chained to respective adjacent display apparatuses.

17. The method according to claim 13, wherein the first predetermined time delay is previously set for the second apparatus.

18. The method according to claim 13, wherein the first predetermined time delay is automatically set according to an arrangement position of the second display apparatus with respect to the first display apparatus.

* * * * *